Figure 1:
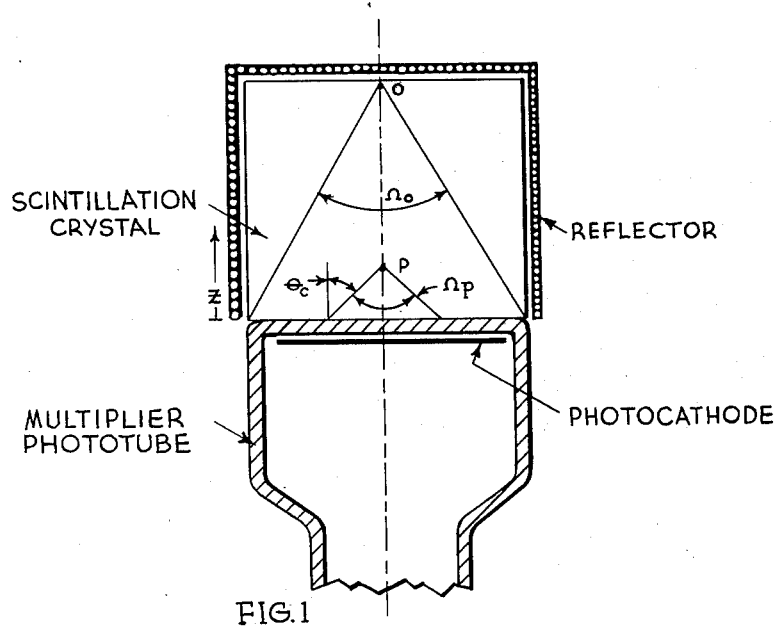

Sept. 3, 1963  R. W. CARLSON  3,102,955
SCINTILLATION DETECTOR WITH COMPENSATING
REFLECTOR FOR THE CRYSTAL
Filed July 6, 1960  2 Sheets-Sheet 1

POSITION ON LATERAL
SURFACE OF CRYSTAL $$\frac{CM\ FROM\ PHOTOCATHODE}{TOTAL\ LENGTH\ OF\ CRYSTAL\ IN\ CM}$$

ROLAND W. CARLSON, INVENTOR.

BY

Sept. 3, 1963          R. W. CARLSON                3,102,955
       SCINTILLATION DETECTOR WITH COMPENSATING
                 REFLECTOR FOR THE CRYSTAL
Filed July 6, 1960                           2 Sheets-Sheet 2

ROLAND W. CARLSON, INVENTOR.

BY

Robert J. Blanke Atty.

3,102,955
SCINTILLATION DETECTOR WITH COMPENSATING REFLECTOR FOR THE CRYSTAL
Roland W. Carlson, East Cleveland, Ohio, assignor to The Harshaw Chemical Company, Cleveland, Ohio, a corporation of Ohio
Filed July 6, 1960, Ser. No. 41,149
3 Claims. (Cl. 250—71.5)

The present invention relates to improved components for a radiation detector of the scintillation meter type.

Scintillation meters are radiation detectors which function by means of converting radiation energy into light energy and thence into a measurable electric current. The basic components of the scintillation meter are a scintillation crystal, a photomultiplier tube mounted thereon and a means for recording the electric impulse generated by the phototube. In practice gamma ray photons from a source of radiation strike the crystal causing flashes of light to occur. The flashes of light or scintillations are directed to the photomultiplier tube where they are converted into an electric current at the photo cathode and then amplified by a system of secondary emitting electrodes within the tube. The current output from the photomultiplier tube is sent to electronic devices which process and display the information contained in the output current.

A most important property of a gamma ray scintillation spectrometer is its resolving power. That is, its ability to display as separate peaks in the output spectrum two gamma rays whose energy differential is small. The ideal gamma ray scintillation spectrometer would yield a single line of zero width in the output spectrum for monoenergetic incident gamma rays. However, in practical spectrometers there is an instrumental line width to contend with. This instrumental line width limits the resolving power (the ability to separate closely spaced lines) of the spectrometer.

The instrumental line width in gamma ray scintillation spectrometers is due to several factors. Among these are: (a) the variation in light collection efficiency throughout the volume of the scintillation crystal; (b) variations in energy conversion efficiency throughout the volume of the crystal; and (c) non-uniformity of the photo cathode viewing the scintillation events in the crystal. Factor (a) is a significant variable as far as most practical crystals are concerned. Factor (b) is small compared to (a) in the case of a good quality scintillation crystal. However, in low grade material it can become the dominant factor. Factor (c) is only important when the scintillations are occurring near the photo cathode. The factors can be independently measured but in an assembled detector only their combined effect is measured. What one observes is a variation in output pulse height as a point source of $\gamma$-radiation is moved over the surface area of the crystal. For most cases of interest, the dominant factor being so measured is (a). Thus, these variations mean that some regions of the crystal are giving higher light outputs than others. It should be noted that if reduction of the light output in the crystal where light output is high were possible, and also if an increase in the light output in regions of the crystal where light output is low could be had, the total effect would be that every region of the crystal would give rise to the same light output. Such a balanced light output would result in minimizing the effects of $a$, $b$ and $c$. The reduction of variations in these foregoing factors will result in a reduction of the instrumental line width.

It is, therefore, an object of this invention to provide an improved scintillation crystal by means of a crystal light reflector system which has minimum efficiency in regions of said crystal where light output is high and maximum efficiency in regions of said crystal where light output is low.

It is another object of this invention to provide an improved scintillation meter component by means of a crystal light reflector system which has minimum efficiency in regions of said crystal where light output is high and maximum efficiency in regions of said crystal where light output is low, said crystal being optically coupled with the photomultiplier tube.

A better understanding of the invention may be had from a discussion of the problem being dealt with in superior crystals, or more specifically variation in light collection efficiency throughout the volume of the scintillation crystal. The problem will be apparent from the detailed description employing drawings as follows:

FIG. 1, which is not to scale, represents a broken cross section of a scintillation meter component.

Figure 2:
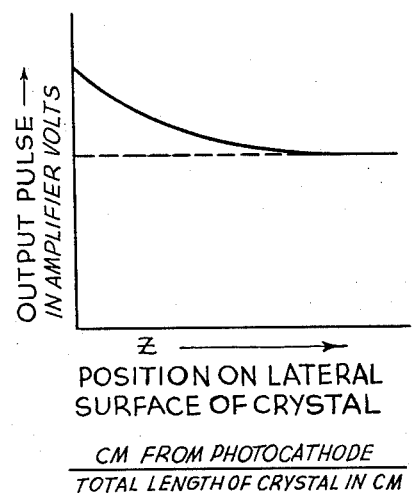

FIG. 2 is a diagram plotting output pulse against the position of the point source of gamma rays on the lateral surface of the crystal.

Figure 3:
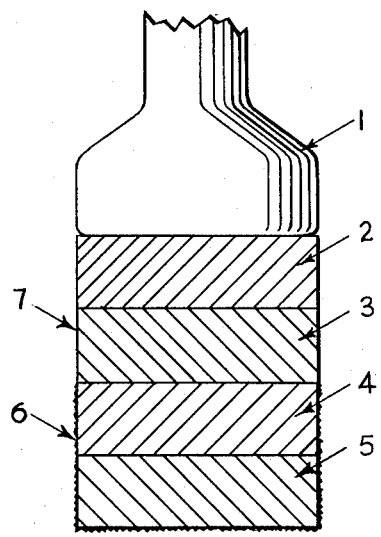

FIG. 3, which is not to scale, represents a broken partial cross section of a compensating reflector multiple crystal scintillation meter component.

Figure 4:
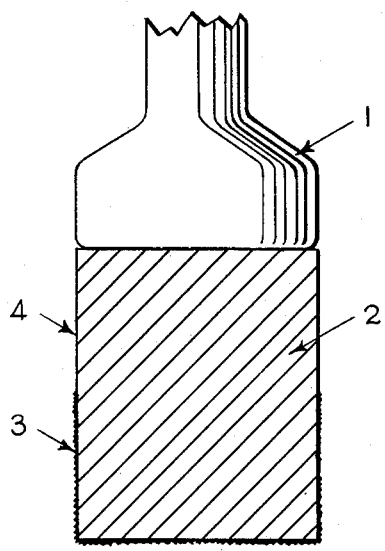

FIG. 4, which is not to scale, represents a broken partial cross section of a compensating reflector unitary crystal scintillation meter component.

Referring now to FIG. 1, consider a scintillation event of unit gamma ray energy deposition at the point P. The amount of light that directly reaches the photo cathode is that defined by the solid angle $\Omega_p$. This solid angle is limited by the semi-apex angle $\theta_c$, which is the critical angle for total internal reflection as determined by the indices of refraction of the crystal and the interface between the crystal and the phototube. The rest of the light emitted from P has the solid angle $4\pi - \Omega_p$ and is directed toward the reflecting surface of the crystal either directly or after a total internal reflection from the crystal-phototube interface. This light eventually reaches the photo cathode but attenuated in intensity by the light collection efficiency (L) of the reflector system. Assume for the moment that L is constant for the system. Hence, the total amount of light reaching the photo cathode from the point P is:

$$\phi_p = \phi\left[\frac{\Omega_p}{4\pi} + \frac{(4\pi - \Omega_p)}{4\pi} \cdot L\right] \quad (1)$$

where $\phi$=total amount of light produced at P.

At the point O, however, the amount of light directly reaching the photo cathode is defined by the solid angle $\Omega_o$, which in turn now is limited by the photo cathode diameter and not by the critical angle as was the case at point P. As before, the reflected light reaches the photo cathode with the light collection efficiency L and the total amount of light reaching the photo cathode from the point O is:

$$\phi_c = \phi\left[\frac{\Omega_o}{4\pi} + \frac{(4\pi - \Omega_o)}{4\pi} \cdot L\right] \quad (2)$$

Since $\Omega_o$ is different from $\Omega_p$, and since Equations 1 and 2 differ on the right-hand side only by $\Omega_o$ and $\Omega_p$, obviously $\phi_p$ is different from $\phi_c$. Thus, equivalent energies deposited at P and O will result in different output pulses from the phototube and the spectrometer shows different energies where equivalent energies should be shown. In the example shown, if the photo cathode was perfectly uniform there would be no variation in output pulse for equal energy events on the axis of the crystal up to a point where the critical angle limitation and the photo cathode diameter limitation are equal. From there to the end of the crystal we could expect a steady variation in output pulse due to the variation in solid angle to the phototube. This then is the origin of the variation in light collection contribution to the instrumental line width in gamma ray spectrometers.

The example cited was ideal for two reasons: first, current photo cathodes are not uniform and secondly, the light collection efficiency (L) can be shown to be a function of position in the volume of the crystal and not a constant as assumed.

If a scintillation crystal and phototube are mounted and combined according to the current state of the art and the output of the system is measured for plotting the source of gamma rays at various positions on the surface area of the crystal, a curve such as in FIG. 2 might be obtained. This curve is the result of the effects mentioned previously. It includes effects of variations in light collection efficiency, effects of variation in energy conversion efficiency, and effects of photo cathode non-uniformity.

I have now found that it is possible to reduce the light ouput in regions of the crystal where light output is high and to increase the light output in regions of the crystal where light output is low in such a way that all measurable regions of the crystal give rise to approximately the same light output. This new and novel system of compensated light output results in a substantial reduction of the instrumental line width of the system. Such compensation can be obtained by allowing the reflectance of the reflector system to be a compensating function of the response function, such as the response function shown in FIG. 2.

It is well known that the degree of surface roughening of the scintillation crystal itself affects the light output of the crystal as a whole. This means that surface treatment of the crystal is an integral part of the reflector system and that the reflectivity is a function of the surface treatment as well as the reflector material itself. Hence, by adjusting the surface treatment of the crystal in accordance with the response function measured for uniform surface treatment, it should be possible to obtain an approximately uniform response with such compensation. In addition to variations in surface roughening as a means of obtaining a uniform response, a compensating system may be employed by variations in the reflectivity of the reflector material itself, such as for instance darkening pigment variations in aluminum oxide and magnesium oxide reflectors, combinations of aluminum oxide and aluminum foil reflector, combinations of magnesium oxide and aluminum foil reflectors, and by variations in the spectral reflectivity of the refector material (that is to say, the spectrum of the light incident on the reflecor differs from that reflected). The reflector system adjustment may be a graduated adjustment or may be a uniform adjustment confined to certain well defined areas.

The compensation of the reflector system of the scintillation crystal was carried out as follows: the crystal is mounted to a photomultiplier tube by means of conventional techniques. The response to a source of radioactivity at the surface of the crystal is then mapped by measuring the pulse height response as a function of position of the point source of monoenergetic radiation, such as, for instance, cesium 137. From the data obtained by this mapping procedure, a curve such as shown by the solid line in FIG. 2 may be obtained wherein output pulse is plotted against position of the source of $\gamma$ rays on the lateral surface of the crystal. A study of this curve determines where the pulse height response should be reduced so that uniform pulse height response may be obtained. From the hypothetical plot shown on FIG. 2, it is obvious that the light output of the first few inches of the crystal must be reduced. A reduction in the light output may be obtained by polishing the lateral surface in the preselected region. Crystal polishing is a well known method of reducing crystal light reflection efficiency due to the light trapping effect of the polished surface. The selectively polished crystal is then remapped by the procedure previously outlined. The resultant curve is similar to the hypothetical curve mapped by the dotted line on FIG. 2. It should be noted that output pulse is now approximately uniform. If, however, the remapping still detects some non-uniformity, further polishing of the crystal surface may be carried out until a uniform response is obtained. While crystal polishing has been given as a common method for obtaining uniform response, an approximation to uniform response of the crystal can also be obtained by other methods such as, for instance, by application of less efficient reflectors or by combinations of both methods.

The following are specific examples of preparation of compensated crystals: Example I, corresponding to the scintillation meter component shown in FIG. 4, and Example II, corresponding to the scintillation meter component shown in FIG. 3. Following examples are illustrative of the invention and should not be considered as limiting the spirit or scope of this invention.

*Example I*

A solid scintillation crystal having dimensions of 1" in diameter and 8" in length was coupled to a photomultiplier tube by means of an optical coupling. This unit is represented by FIG. 4 of the drawings. The measured photo peak (for a source of cesium 137 gamma rays placed 6" from the axis of the crystal and midway between the ends so as to more or less uniformly irradiate the crystal) extended from a relative pulse height of 4.5 to 8. The plotted photo peak was very unusual and no simple resolution could be measured. 4" of the lateral surface of the crystal of the portion near the photomultiplier tube was then polished. The same source of radiation was then applied in a manner previously outlined and a plot of pulse height from the data thereby obtained revealed increased uniformity.

*Example II*

A crystal 1½" x 8" in length was obtained by optically coupling four crystals 1½" in diameter x 2" in length. The crystal was coupled with a photomultiplier tube in a conventional manner. This unit is represented by FIG. 3 of the drawings. A photo peak measurement of this unit (for a source of cesium 137 gamma rays placed 6" from the axis of the crystal and midway between the ends so as to more or less uniformly irradiate the crystal) showed that four distinct photo peaks were observed, each photo peak corresponding to the respective crystal employed in making up the 1½" x 8" unit. These photo peaks had relative pulse heights 2.5, 3, 4.1 and 7; the pulse heights being given in the respective order of the crystal arrangement—pulse height of 2.5 corresponding to that crystal which is furthest from the photomultiplier tube. The crystal assembly was then compensated by polishing lateral surfaces of the two crystals nearest the phototube. The two crystals which were furthest from the phototube were left unaltered; their original condition being in the form of a sanded surface. The photo peak was then measured by the same procedure previously outlined. Four photo peaks were found to have merged into a single uniform photo peak.

Turning to FIG. 3 of the drawings, FIG. 3 represents a scintillation meter component consisting of a photomultiplier tube which is coupled to a composite scintillation crystal made up of individual scintillation crystals 2, 3, 4 and 5. The junctures between scintillation crystals 2, 3, 4 and 5 are affected by means of an optical coupling. The juncture between photomultiplier tube 1 and the contacting face of scintillation crystal unit 2 is also affected by means of an optical coupling. Scintillation crystal units 4 and 5 have a roughened surface, such as the surface produced by treatment with No. 180 grit sandpaper. The roughened surface has been designated as 6. Scintillation crystal units 2 and 3 have polished lateral surfaces designated on the drawings as 7. In operation, an emanation from an external source of radioactive energy entering the scintillation crystal and being converted to light in either of scintillation crystal units 4 or 5 will have the advantage of a superior reflector in the surface roughened area 6. The surface roughening provides for diffused reflection, which will allow maximum amounts of light emanations occurring in units 4 and 5 to reach the photomultiplier tube 1 rather than being trapped within crystals 4 and 5. Light emanations occurring within scintillation crystals 2 and 3, however, are not aided to any extent by the surface roughened area but rather are subjected to the polished surface 7. The polished surface 7 is a specular reflector and, therefore, light emanations occurring in scintillation units 2 and 3 may be partially trapped within these units rather than reaching photomultiplier tube 1. The over-all result is that a balance of the efficiency of each scintillation crystal unit in delivering light to photomultiplier tube is obtained.

Turning to FIG. 4 of the drawing, FIG. 4 represents a scintillation meter component comprising a photomultiplier tube 1 optically coupled to a scintillation crystal 2. Scintillation crystal 2 has that portion of its lateral surface which is furthest from the photomultiplier tube roughened by means such as treatment with No. 180 grit sandpaper. The surface roughened area has been designated as 3. Scintillation crystal 2 has the lateral surface which is nearest photomultiplier tube 1 polished, said polished area being designated as 4. In practice radioactive emanations reaching scintillation crystal 2 from an external source of radioactive energy producing light emanations within that volume bounded by the surface roughened walls 3 are subjected to superior reflectivity. The surface roughened area 3 is a diffuse reflector and, therefore, light coming into contact with the diffuse reflector has a high probability of reaching the photomultiplier tube 1. Light emanations, however, which occur within that volume bounded by the polished lateral surface 4 have the disadvantage of being subjected to a specular reflector. A specular reflector may trap certain portions of light emanations within that volume of the crystal bounded by the polished lateral surface 4. The result of varying the reflective abilities of the lateral surface of the scintillation crystal 2 is to provide a uniform response of light emanations reaching the photomultiplier tube 1 regardless of the point within the scintillation crystal 2 at which the scintillation event occurs.

What I claim is:

1. A scintillation meter component comprising, in combination, a solid scintillation phosphor, the same being a transparent crystal, a photomultiplier tube optically coupled thereto, a portion of said phosphor having a matte surface and a portion thereof having a polished surface, the portion having the polished surface being closer to the coupling than the portion having the matte surface and an additional diffuse reflecting coating on at least a portion of said phosphor.

2. A scintillation meter component comprising, in combination, a solid scintillation phosphor, the same being a transparent crystal, a photomultiplier tube optically coupled thereto, a portion of said phosphor having a matte surface and a portion thereof having a polished surface, and an additional diffuse reflecting coating on at least a portion of said phosphor.

3. The meter component according to claim 2 wherein said additional diffuse reflecting coating covers substantially all that portion of said phosphor not in contact with said photomultiplier tube.

References Cited in the file of this patent

UNITED STATES PATENTS

| | | |
|---|---|---|
| 1,904,895 | Campbell | Apr. 13, 1933 |
| 2,291,577 | Farnsworth | July 28, 1942 |
| 2,559,219 | Ludeman | July 3, 1951 |
| 2,666,145 | Eversole | Jan. 12, 1954 |
| 2,897,368 | Lundberg | July 28, 1959 |
| 2,956,162 | Armistead | Oct. 11, 1960 |
| 2,967,935 | Cook | Jan. 10, 1961 |